Feb. 24, 1942.　　　　E. W. DAVIS　　　　2,274,473
LUBRICATING APPARATUS
Filed Jan. 11, 1937　　　6 Sheets-Sheet 1

Feb. 24, 1942. E. W. DAVIS 2,274,473
LUBRICATING APPARATUS
Filed Jan. 11, 1937 6 Sheets-Sheet 2

Feb. 24, 1942.   E. W. DAVIS   2,274,473
LUBRICATING APPARATUS
Filed Jan. 11, 1937   6 Sheets-Sheet 3

Feb. 24, 1942.  E. W. DAVIS  2,274,473

LUBRICATING APPARATUS

Filed Jan. 11, 1937  6 Sheets-Sheet 4

Inventor.
Ernest W. Davis
By Williams, Bradbury,
McCaleb & Hinkle Attys.

Patented Feb. 24, 1942

2,274,473

UNITED STATES PATENT OFFICE 2,274,473

LUBRICATING APPARATUS

Ernest W. Davis, Oak Park, Ill., assignor to Stewart-Warner Corporation, Chicago, Ill., a corporation of Virginia Application January 11, 1937, Serial No. 119,913

12 Claims. (Cl. 184—7)

My invention relates generally to centralized lubricating apparatus, and more particularly to a centralized lubricating system for supplying a plurality of bearings with oil at metered rates.

It is an object of my invention to provide an improved oiling device for a plurality of bearings, in which the rate of flow of oil to each of the bearings may be individually regulated, and in which indicating means is provided to show the rates of flow to the various bearings.

A further object is to provide an oiling system for a plurality of bearings in which the rate of flow to each of the bearings is controlled by the adjustment of the slope of a capillary tube through which the oil is fed to the bearing.

A further object is to provide an improved reservoir for a centralized lubricating system in which the oil level is maintained constant.

A further object is to provide an improved reservoir for oiling systems in a portion of which the level is maintained constant and in which removal of the filling cap of the reservoir results in closure of a valve to prevent an undue rise in the constant level portion of the reservoir.

Other objects will appear from the following description, reference being had to the accompanying drawings, in which.

In general, the apparatus of my invention comprises a main reservoir, an auxiliary reservoir supplied with oil from the main reservoir by means which maintains the level in the auxiliary reservoir at a constant height, individually adjustable metering means for feeding oil from the auxiliary reservoir to a plurality of individual oil receivers, visual flow indicators in the form of a transparent tube for draining oil from the receivers, and means for conducting the oil from the glass tubes to the bearings or other parts to be lubricated.

In most of the similar apparatus of the prior art where the rate of flow of oil was at a relatively slow rate, the means for indicating whether or not the oil was being properly supplied to the bearings comprised a sight feed device through which the oil would drip, and the only way of determining the rate of oil flow was to count the number of drops of oil fed during a certain period. If the rate of flow was low, it was extremely difficult, except by observing the sight feed for a long period, to determine whether or not any oil was flowing, and the machine attendant consumed a considerable amount of time in checking the lubricating system merely to determine whether or not any oil was being fed to the bearings. The operation of determining the rate of flow was, of course, still more time-consuming. With the apparatus of my present invention, the attendant can tell at a glance whether or not the oil is being properly supplied to a plurality of bearings, and can readily observe the relative rates at which the various bearings are being supplied with oil.

The embodiment of my invention shown in Figs. 1 to 11 inclusive comprises a reservoir casting 20 suitably mounted upon a base casting 22 and secured thereto by tie rods 24. The reservoir casting 20 is closed by a cover 26 which is secured to the reservoir casting 20 by means of studs 28 having cap nuts 30. An auxiliary reservoir 32 in the shape of an elongated trough is formed integrally with a casting 34 which is secured to the reservoir casting 20 by cap screws 36, a suitable gasket 38 being interposed between the casting 34 and the upper faced ledge portion 40 of the reservoir casting 20.

Figures 3, 4:
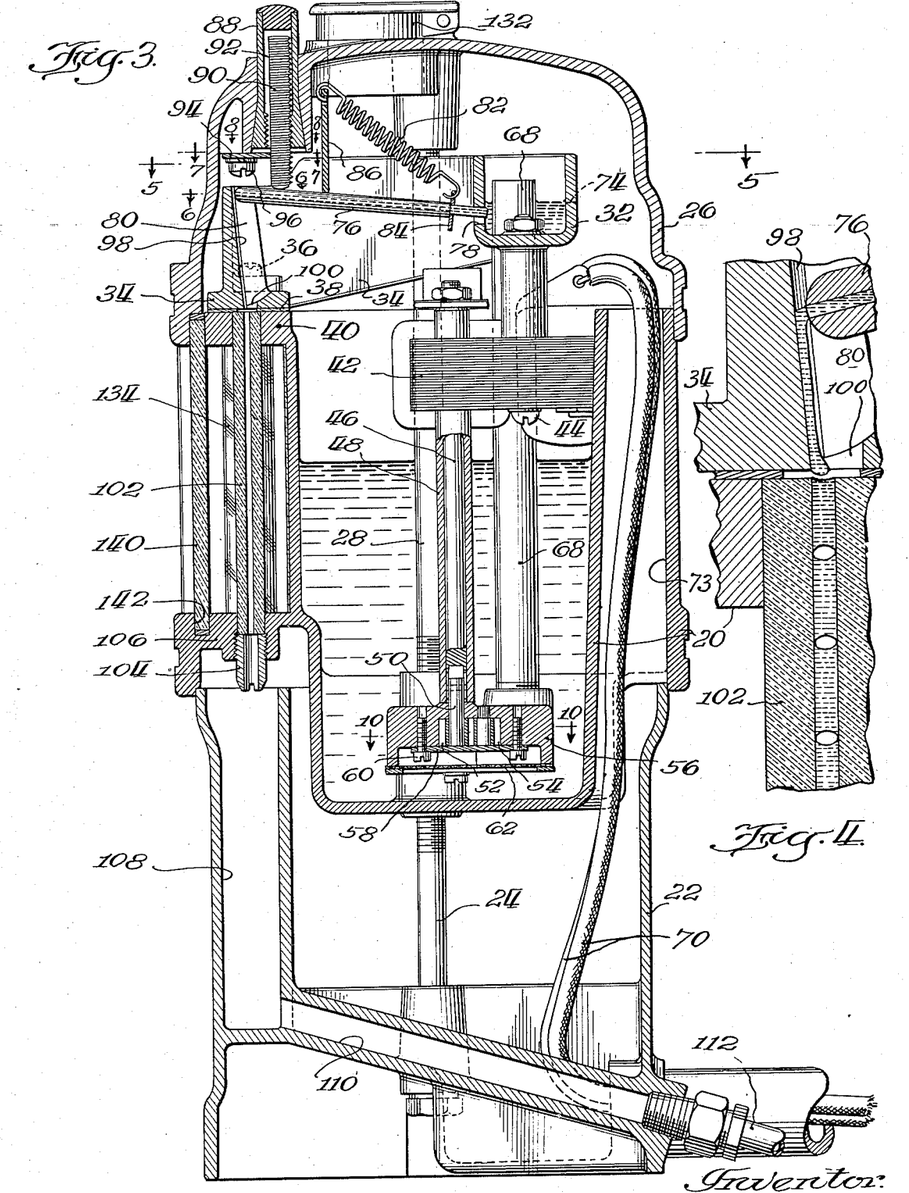
Fig. 3 is a vertical sectional view thereof taken on the line 3—3 of Fig. 1.
Fig. 4 is an enlarged fragmentary sectional view illustrating the operation of the flow indicating means.
Figure 5:
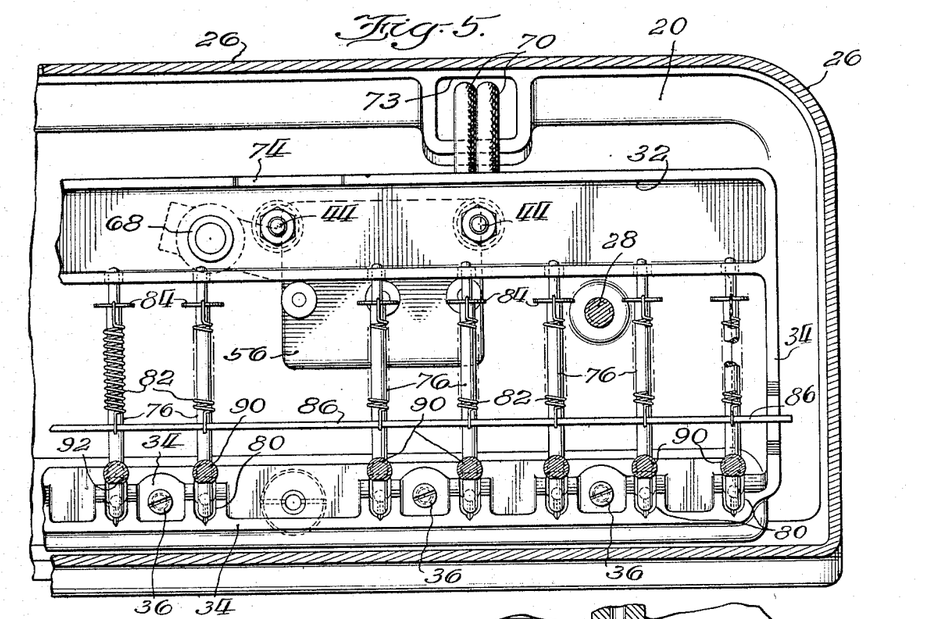
Fig. 5 is a horizontal sectional view taken on the line 5—5 of Fig. 3.
Figures 10, 11, 14, 15:
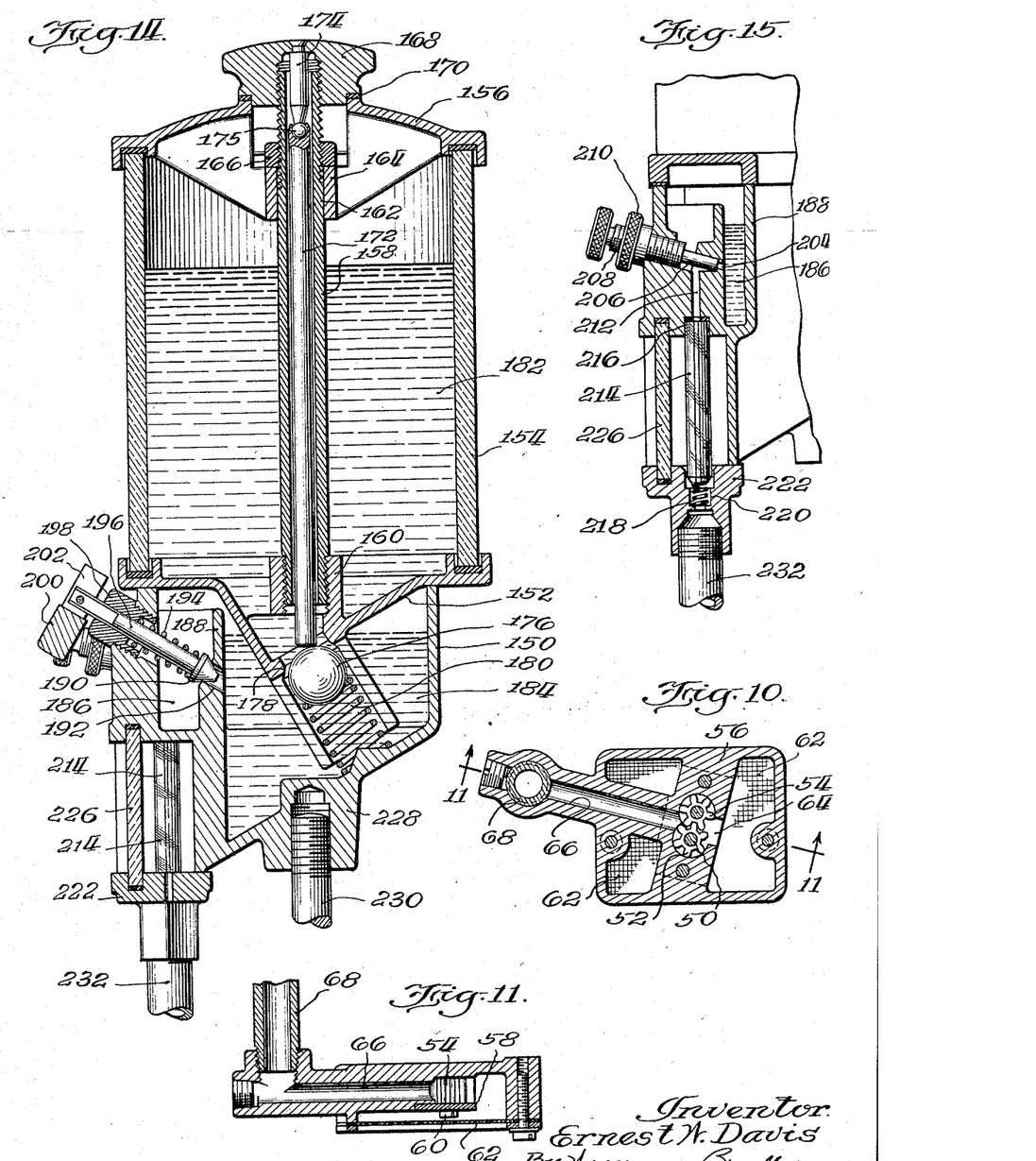
Fig. 10 is a horizontal sectional view of the gear pump taken on the line 10—10 of Fig. 3.
Fig. 11 is a vertical sectional view of the gear pump taken on the line 11—11 of Fig. 10.
Fig. 14 is a vertical sectional view of the apparatus taken on the line 14—14 of Fig. 13.
Fig. 15 is a fragmentary vertical sectional view taken on the line 15—15 of Fig. 12.
Figure 12:
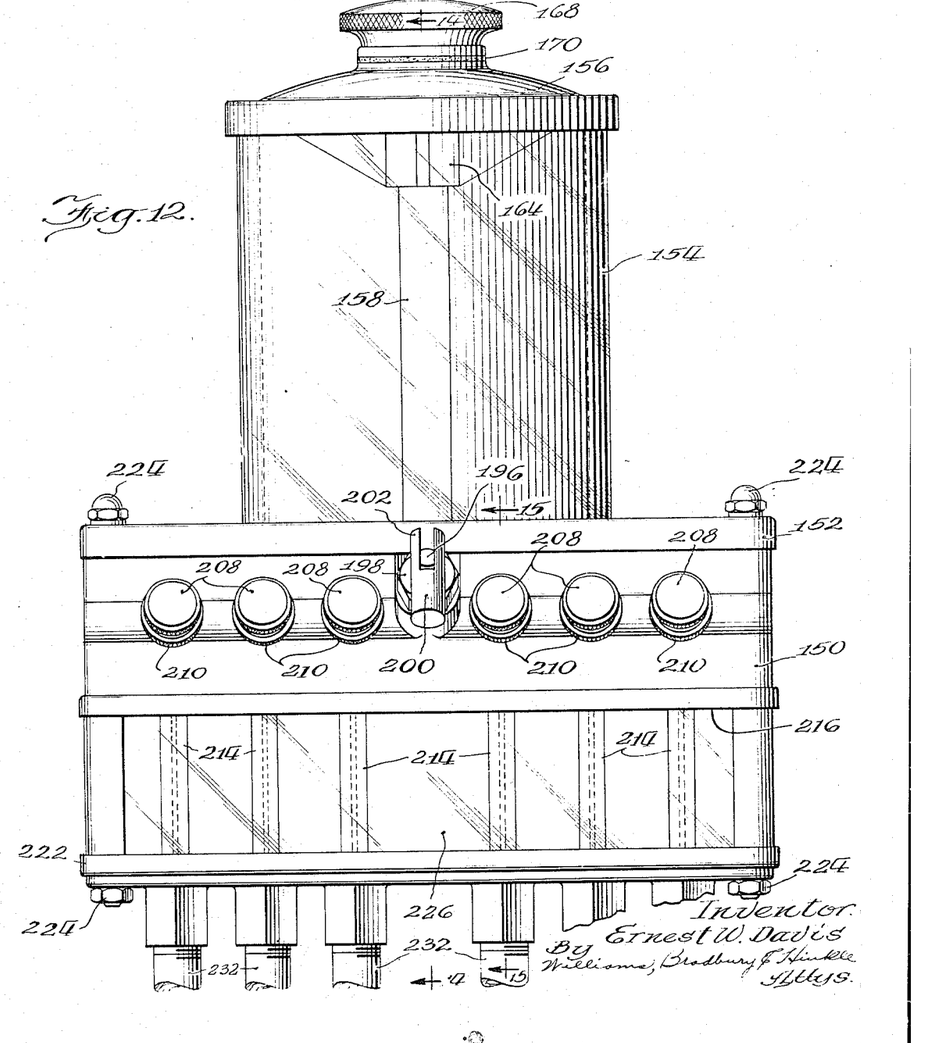
Fig. 12 is a front elevational view of a modified form of my invention.
Figure 13:
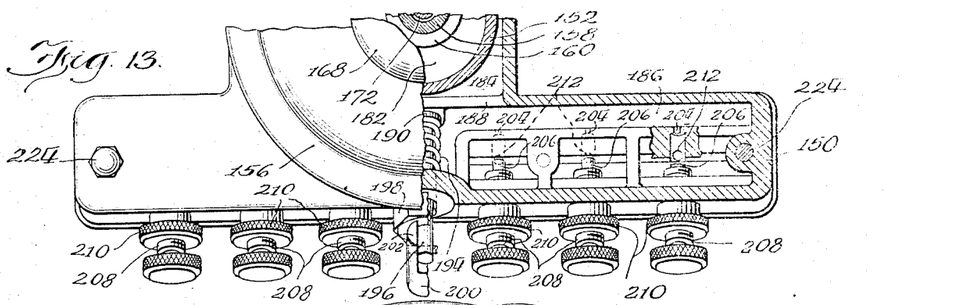
Fig. 13 is in part a plan and in part a horizontal sectional view of the apparatus shown in Fig. 12.

An electric motor 42 is secured to the trough portion 32 of the casting 34 by bolts 44, the drive shaft 46 of the motor extending vertically downward through a tube 48 and being flexibly coupled to the shaft 50 of a pump comprising intermeshing gears 52 and 54 suitably mounted in a pump casting 56. The gears 52 and 54 are maintained in the chamber of the pump by a plate 58 secured to the pump casting 56 by cap screws 60. The lower surface of the pump casting 56 is covered by a filtering screen 62 suitably secured to the casting. The oil flowing upwardly through this screen 58 enters the inlet port 64 of the gear pump and is discharged through a passageway 66 which communicates with a pipe 68 which projects upwardly through the bottom of the auxiliary trough-shaped reservoir 32.

The motor is supplied with current through a pair of conductors 70 which extend through a suitable aperture formed in the base casting 22 and upwardly through a passageway 73 formed in the reservoir casting 20. The gear pump is adapted to operate continuously to force oil from the main reservoir into the auxiliary reservoir. The capacity of the gear pump greatly exceeds the requirements, the surplus oil pumped into the auxiliary trough reservoir 32 being discharged through a spillway 74 formed in the side of the trough 32. Lubricant is conducted from the auxiliary reservoir 32 by a plurality of tubes 76 of capillary dimensions. The inner ends of these tubes are of reduced diameter and project through suitable openings 78 formed in the auxiliary reservoir 32 below the normal oil level therein. The openings 78 are considerably larger than the ends of the tubes 76, but, due to the surface tension of the oil there will be no appreciable leakage of lubricant through these openings. The forward ends of the tubes 76 are held in grooves 80 formed in the casting 34 by tension springs 82, one end of each of which is anchored to a washer 84 which fits over the reduced end portion of the tube and the other end of which is anchored to a plate 86 secured at its ends in the casting 34. The slope of the capillary tubes 76 may be adjusted individually by rotation of nuts 88 threaded upon studs 90 which have flattened surfaces 92. The nuts 88 are mounted for free rotation in the casting 26 and the studs 90 are prevented from rotation by the engagement of their flattened surfaces 92 with the edge of a plate 94 which is secured to the cap casting 26 by the cap screws 96. The lower ends of the studs 90 engage the capillary tubes 76 respectively, and thus upon rotation of the nuts 88, the outward ends of the capillary tubes 76 may be raised or lowered as desired to vary the rate of flow of oil through them.

Figures 6, 7, 8, 9:
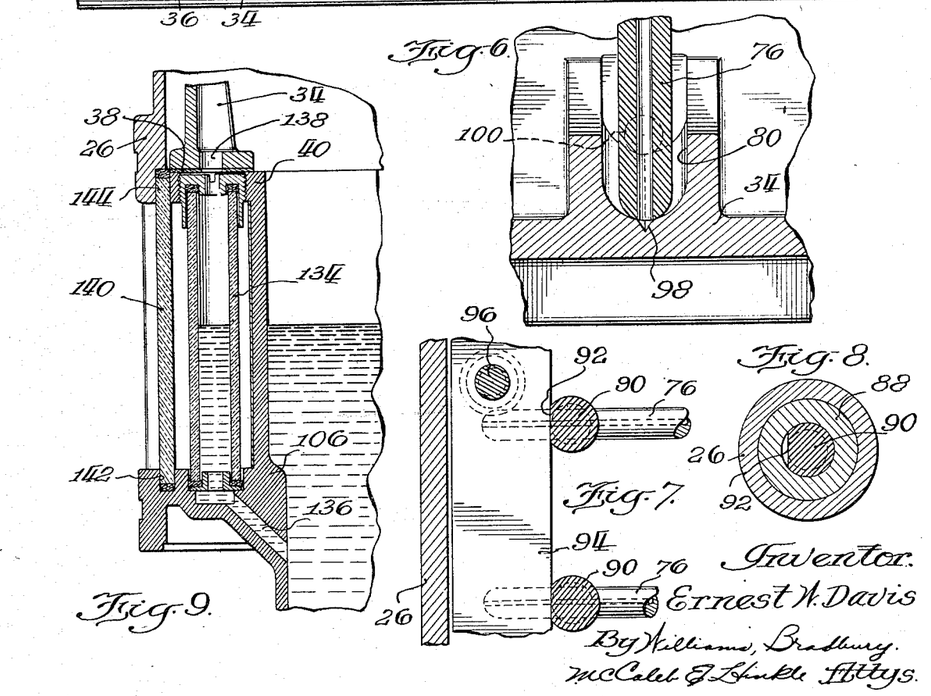
Fig. 6 is an enlarged fragmentary detail showing the end of the capillary tube in normal position adjacent the capillary oil conducting groove.
Fig. 7 is an enlarged fragmentary sectional view taken on the line 7—7 of Fig. 3.
Fig. 8 is a similar view taken on the line 8—8 of Fig. 3.
Fig. 9 is a vertical sectional view of the oil level indicator, taken on the line 9—9 of Fig. 1.

The outer ends of the capillary tubes 76 are rounded as indicated in Fig. 6, and their bores are in registry with a triangular capillary groove 98 formed at the base of the rounded groove 84. The capillary grooves 98 terminate in an aperture 100 for receiving the oil. Beneath each of the receiving ports 100 is a glass tube 102 having a relatively small internal bore of such diameter that oil and air will not pass therein, the glass tubes being held in position with their upper ends in engagement with the gasket 38 by nipples 104 threaded in a ledge 106 forming part of the reservoir casting 20. The lubricant flows through the hollow nipples 104 into passageways 108, 110 formed in the base casting 22 and from the passageway 110 through suitable conduits 112 to bearings 114, 116, 118.

Figure 1:
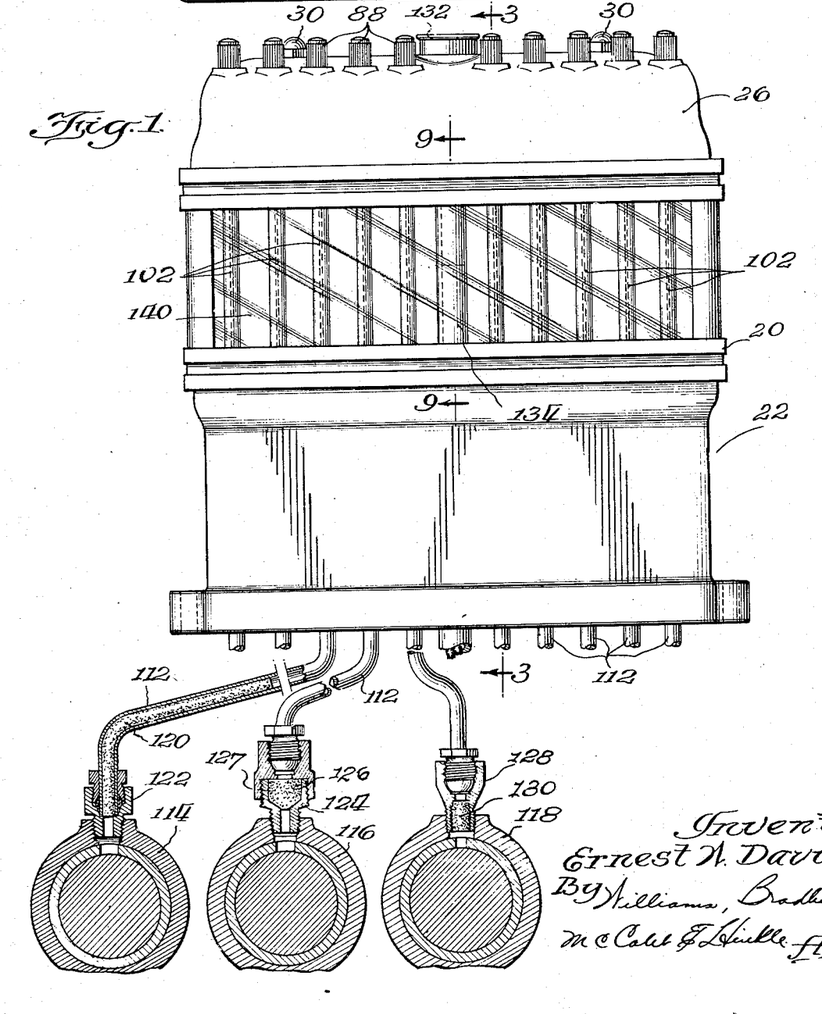
Fig. 1 is a front elevation of the reservoir showing several of the discharge conduits connected to bearings to be lubricated, the latter and their associated parts being illustrated in central vertical cross section.
Figure 2:
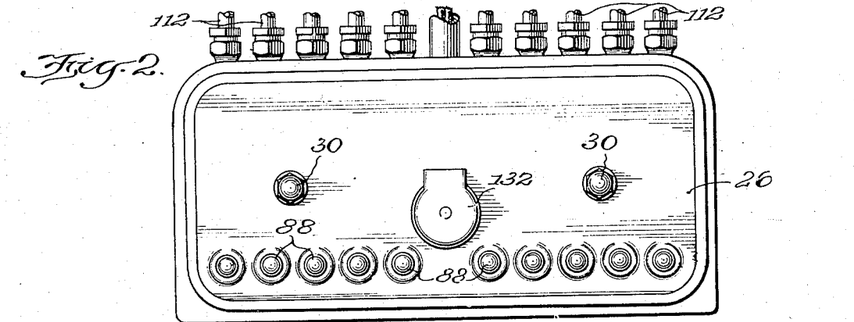
Fig. 2 is a plan view of the reservoir.

The conduits 112 may be connected to the bearings by any suitable flow retarding fitting, three types of which are shown in Fig. 1. The conduit 112 connected to the bearing 114 has its lower end plugged with a loose wicking 120, the ends of the conduit being connected to the bearing 114 by suitable compression coupling 122. The bearing 116 is provided with a bushing 124 having an enlarged bore 126 filled with a suitable packing 127 through which the oil may flow slowly. The bushing 124 is connected, by suitable fittings, with the conduit 112. Attached to the bearing 118 is a bushing 128, the inner portion of which is threaded or otherwise roughened to receive and retain a plug 130 of suitable wicking or packing material.

The cover 26 of the reservoir is provided with a suitable filler having a hinged cap 132, through which lubricant may be poured into the main reservoir formed in the reservoir casting 20. Necessity for replenishing lubricant supply in the main reservoir is determined by a suitable liquid level gauge comprising a glass tube 134 (Fig. 9) suitably mounted in sealed relation between the portions 40 and 106 of the reservoir casting 20, the lower end of the tube 134 being in communication with the main reservoir through a passageway 136 and the upper end thereof communicating with the interior of the cap casting 26 through a port 138 formed in the casting 34. The tubes 102 and gauge glass 134 are preferably protected from breakage and dust by a plate glass window 140, which is suitably mounted in a groove 142 formed in the reservoir casting 20, and is held in place by the cover casting 26 by fitting into a rabbet 144 formed in the lower front edge thereof.

In operation, the reservoir is filled through the opening beneath the filler cap 132, the height to which it is filled being determined by observation of the level of the oil in the reservoir through the gauge glass 134. The conductors 70 of the motor are connected to a suitable source of power. When the lubricator is utilized with an electric motor driven machine, it is usually desirable to have the conductor 70 connected in parallel with the conductor supplying current to the motor driving the machine so that the lubricator will function whenever the machine is being operated, thereby eliminating the possibility that the machine operator may neglect to render the lubricator operative by forgetting to turn the switch connecting the conductors 70 to the source of electric current.

The motor 42 being supplied with current rotates the pump gears 52, 54, causing a copious supply of oil to be drawn through the screen filter 62 and to be discharged through the pipe 68 into the trough-shaped auxiliary reservoir 32. The oil will continuously overflow through the spillway 74 formed in the reservoir 32, and the level of the oil within the auxiliary reservoir will thus be maintained constant. The several capillary tubes 76 will be adjusted to supply the required amount of lubricant to their several bearings by rotating the cap nuts 88, thereby causing raising or lowering of the studs 90, and hence raising or lowering of the outer ends of the capillary tubes 76. The tubes will be held in engagement with the ends of the studs 90 by the tension springs 82, upward swinging movement of the tubes being limited by their engagement with the lower edge of the spring anchorage plate 86. Depending upon the slope of the tubes 76, lubricant will flow through them at greater or lesser rate from the auxiliary reservoir 52 to the capillary groove 98 formed in the casting 34. It has been found that the adjustable slope capillary tubes provide an extremely sensitive and accurate means for controlling the rate of lubricant flow.

The lubricant flowing down the capillary groove 98 will collect in the receiving recess 100 and flow from this recess into the bore of the associated glass tube 102. The sizes of the parts are so proportioned that even though the capillary tube 76 is adjusted so as to slope downwardly the maximum extent, the rate of oil flow possible through the capillary tube will be slightly less than the rate of flow of oil through the glass tube 102 under the pressure head represented by the length of the glass tube. As a result, the stream of oil flowing through the glass tube will not be continuous, but will, at intervals, be interrupted by a bubble of air. The constants may be such that even under conditions of maximum flow at least one bubble of air will be passing downwardly through the glass tube 102 at all times. When the capillary tube 76 is adjusted for a slower flow rate, the intervals between bubbles of air will become shorter and the bubbles of air larger. The glass tubes magnify the bores therethrough so that the slugs or columns of oil are easily visible.

The glass tubes 102 thus serve as a ready means for comparing the relative rates of flow of oil to the various bearings as well as showing that the lubricant is flowing to each of the several bearings connected to the lubricator. If the glass tube contains any oil, it is an indication that oil is being fed to the connected bearing, and the amount of oil being fed is indicated by the proportion of oil relative to air visible in the tube. The machine operator, therefore, can, by merely glancing at the tubes 132, determine the rate at which oil is flowing to each of the bearings.

In Figs. 12 to 15 inclusive, I have shown a modified form of the invention which is particularly adapted for use upon machines which are not electrically operated or where electric power is not conveniently available. The lubricator comprises a base casting 150, the central opening of which is closed by the bottom casting 152 of a reservoir, the wall of which is formed by a hollow glass cylinder 154 closed by a cover 156. The bottom 152 and cover 156 are suitably grooved and provided with gaskets to receive the ends of the hollow glass cylinder 154. A tubular tie rod 158 is threaded in a suitable bore formed in a boss 160 which is integral with the bottom casting 152 and extends through a bore 162 formed in a boss 164 formed integrally with the cover casting 156. The cover casting 156 is secured to the hollow tie rod 158 by tightening a nut 166 threaded on the upper end of the hollow tie rod. A filler cap 168 is threaded over the upper end of the hollow tie rod 158 and is adapted hermetically to seal the filling opening in the cap casting 156, a gasket 170 being provided for this purpose. A valve actuating rod 172 is secured to a pin 174, which is riveted to the filler cap 168, the rod and pin being joined by ball and socket connection 175.

The lower end of the rod 172 is adapted, when the parts are assembled in normal position, to engage a ball valve 176 and hold the latter away from its seat 178 against the force of a compression coil spring 180. The valve 176 is adapted to control the flow of lubricant from the interior of the main reservoir 182 formed within the glass cylinder 154 to the auxiliary reservoir 184 formed within the base casting 150.

The base casting 150 is provided with a distributing channel or manifold 186 separated from the auxiliary reservoir 184 by a vertical wall 188. Communication between the auxiliary reservoir 184 and the manifold 186 is controlled by a manually operable valve 190 which is normally urged to close a passageway 192 by a compression coil spring 194 which surrounds the valve stem 196. The latter is guided in a bushing 198 threaded in the forward wall of the bottom casting 150 and is operated by means of a handle 200 which is pivoted to the valve stem 196 and has a cam portion 202 which, when the handle 200 is swung into alignment with the valve stem 196, serves to pull the latter outwardly and hold the valve open. Lubricant may flow from the manifold 186 to a plurality of lubricant metering means, each comprising a port 204 which is restricted by a plug 206 at the end of a threaded stem 208, the stem being threaded in a suitably tapped hole formed in the front wall of the casting 150 and being adapted to be locked in adjusted position by a knurled thumb nut 210.

Oil which flows through the passageway 204 past the metering plug 206 will flow by gravity through a vertical passageway 212 and thence through a glass tube 214 which is held within a suitable recess 216 formed in the front wall of the casting 150 by a compression coil spring 218 seated in a suitable counter-bored recess 220 formed in a casting 222 which is clamped to the base casting 150 by a plurality of bolts 224. A window 226 of plate glass is likewise secured in position in front of the glass tubes 214 by the casting 222. The base casting 150 has a suitable tapped boss 228 to receive the end of a threaded rod 230 by which the lubricator may be supported on the machine or other part to be lubricated.

Since the reservoir 182 is hermetically sealed, oil can flow therefrom into the auxiliary reservoir 184 only upon admission of air to the reservoir 182. Thus, the level of oil in the auxiliary reservoir 184 is maintained at the level indicated in Fig. 14, at approximately the highest point of the valve seat 178. When the reservoir is to be filled, the cap 168 is unscrewed and during this operation the valve actuating rod 178 will likewise be retracted and permit the spring 180 to force the ball valve 176 against its seat 178, thus preventing flow of oil from the main reservoir 182 to the auxiliary reservoir 184 while the reservoir is necessarily at atmospheric pressure during the filling operation. By this means, flooding of the auxiliary reservoir 184 is prevented during filling.

When it is desired to supply the bearings with lubricant, the valve 190 is opened by operation of its handle 200 and thereby held in open position. Thus lubricant may flow from the auxiliary reservoir 184 through the port 194 into the manifold channel 186, from which it will flow through the various ports 204 past the metering plugs 206 and downwardly through the glass tubes 214 through the conduits 232 which are suitably connected to the bearings to be lubricated. Depending upon the setting of the adjustable restriction plugs 206, the oil will be interspaced by a greater or lesser number of air bubbles as it flows downwardly through the glass tubes 214, in a manner similar to that described above with reference to the preferred construction shown in Figs. 1 to 11 inclusive. When the lubrication operation is to be stopped, the valve 190 is closed by swinging its handle 200 downwardly to the position in which it is shown in Fig. 14.

It will be understood that the level of the oil above the metering ports 204 will afford but a slight pressure head so that the flow through these ports will be at a very slow rate, which can be greatly varied or modified by the adjustable restriction plug 206. In this way, the supply of oil to each of the bearings may be accurately metered to correspond with the needs of the bearing.

Figures 16, 17:
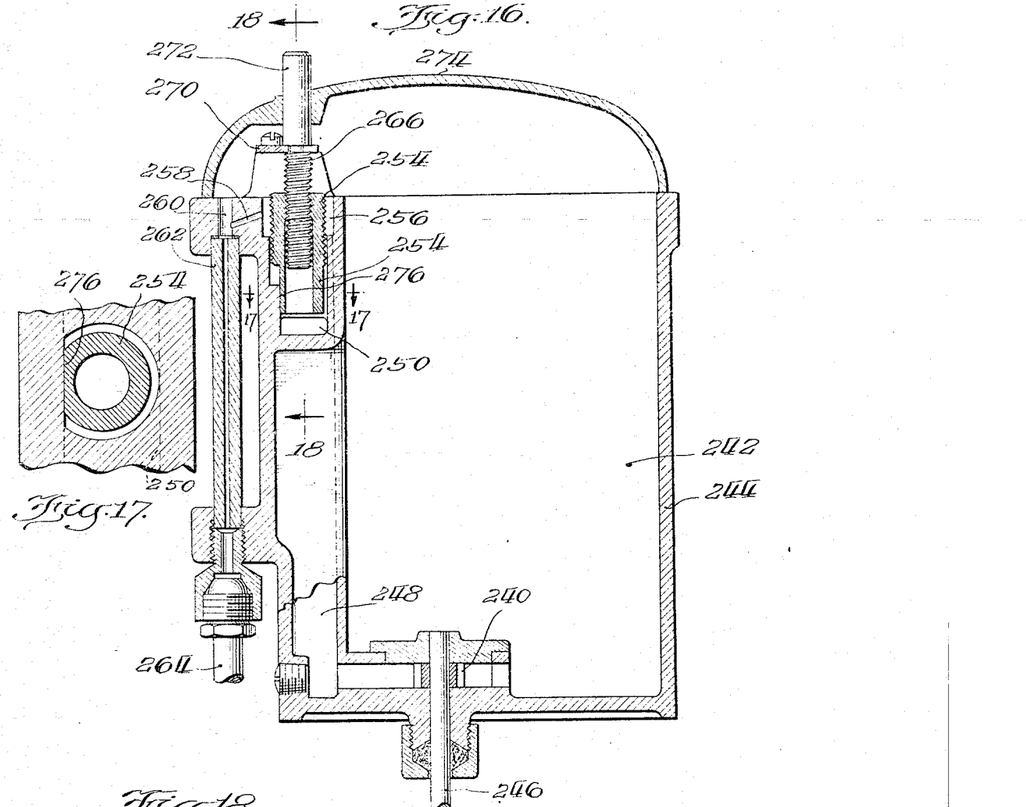
Fig. 16 is a central vertical sectional view of a modified form of my invention.
Fig. 17 is an enlarged fragmentary horizontal sectional view taken on the line 17—17 of Fig. 16.
Figure 18:
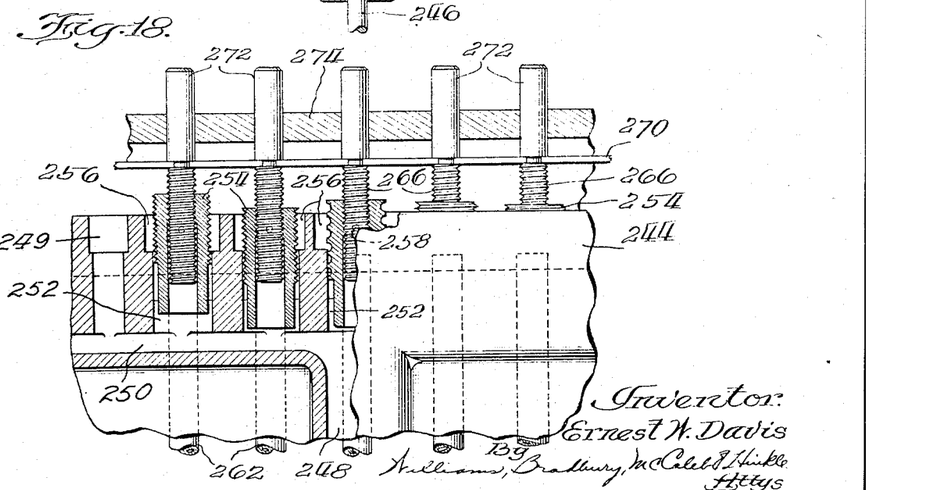
Fig. 18 is a vertical sectional view of the feed regulating means taken on the line 18—18 of Fig. 16.

In Figs. 16, 17, and 18, I have illustrated a further modified form of my invention in which a different type of flow metering device is employed. In this construction, a gear pump 240 is suitably mounted inside and at the bottom of a main reservoir 242 formed in a casting 244. The pump is driven from a suitable source of power by a shaft 246 which may project from the bottom of the reservoir casting. Oil is thus pumped from the bottom of the reservoir upwardly through a duct 248 into a manifold passageway 250. A plurality of smooth bores 252 extend vertically into the passageway 250, and each receives a metering plug 254, the external surface of which is provided with a helical groove of suitable size to provide a relatively long restricted passageway for the control of lubricant flow. Lubricant passing through the helical groove is received in a counter-bore 256, from which the lubricant may flow through a passageway 258 into a vertically drilled hole 260. From the latter, the lubricant may flow downwardly through a glass tube 262 which is suitably secured at the lower end of the drilled hole 260 and the lower end of which is connected to a conduit 264 leading to the bearing to be lubricated.

The effective length of the groove formed in the restriction plug 254 may be varied by raising and lowering the latter by means of a screw 266 which is threaded in the restriction plug 254 and is mounted for rotation in a plate 270. The upper end of the screw 266 has a pin portion 272 projecting through a suitable aperture in the cover casting 274. Each of the restriction plugs 254 has a flat surface 276, as indicated in Fig. 17, which engages the adjacent wall of the passageway 250 and thus is prevented from rotating so that by turning the screw 266, the restriction plug 254 will be raised or lowered to increase or decrease the rate of lubricant flow.

The passageway 248 is preferably provided with an overflow 249 at the level of the top of the reservoir casting 244 so that the flow of oil past the restriction plugs 254 will be under small pressure head, thus making it possible to have the grooves in the restriction plugs 254 of relatively great cross sectional area and therefore less susceptible to becoming clogged. If desired, however, the flow past the various restrictions may be under the pressure head produced by the gear pump 240.

The lubricator shown in Figs. 16 to 18 will operate in a manner substantially similar to that shown in Figs. 1 to 11 inclusive since the oil will be pumped by the gear pump 240 through the restricted passageways of the metering plugs 254 and will thence flow through the passageways 258 and 260 to the glass tubes 262. The oil passing downwardly through the glass tubes 262 will at intervals be separated by bubbles of air, and the proportion of oil visible in the tubes 262 will serve as an indication of the relative rates of flow of oil to the various bearings. The operation will thus be substantially identical with that of the constructions previously described.

If desired, the means for maintaining constant the oil level in the auxiliary reservoir, which is shown in Figs. 12 to 15 inclusive, may be utilized in place of the motor driven pump in the lubricator illustrated in Figs. 1 to 11 inclusive. Similarly, the metering means of Figs. 16, 17, and 18 might be utilized in the lubricator shown in Figs. 1 to 11 or in the lubricator of Figs. 12 to 15 inclusive. The particular construction adopted for any particular machine will be determined by a number of factors, including, the rates of feed required by the various bearings, the type of oil to be used, temperature variations which may be encountered, and the type of machine to be lubricated.

While I have shown and described several embodiments of my invention, it will be readily understood by those skilled in the art that variations may be made in the constructions disclosed without departing from the basic features of my invention. I therefore do not wish to be limited to the precise construction disclosed, but wish to include within the scope of my invention all such modifications and variations which will readily suggest themselves.

What I claim as new and desire to secure by United States Letters Patent is:

1. In an apparatus for supplying oil to a plurality of bearings, the combination of a reservoir, means for maintaining oil in said reservoir at a constant level, an adjustable capillary conduit for conveying oil from said reservoir, a receiver for oil transmitted through said conduit, a transparent tube extending downwardly from said receiver, said tube having a sufficiently small bore that at the adjustment of said capillary conduit for maximum flow rate the oil flowing through said tube will be broken into columns separated by air bubbles, and means for connecting the lower end of said tube to a part to be supplied with oil.

2. In a lubricator, the combination of a trough, means to maintain oil at a constant level in said trough, a plurality of capillary tubes projecting into said trough below the level of the oil therein, means for individually adjusting the positions of said capillary tubes, a plurality of receivers one for each of said capillary tubes, a glass tube connected to the bottom of each of said receivers to convey the oil therefrom, the bore through said tubes being of sufficiently small diameter relative to the amount of oil conveyed that said oil will flow through said glass tube in columns of oil separated by air.

3. In a lubricator, the combination of a main reservoir for oil, an auxiliary reservoir located above the normal level of oil in said main reservoir, a pump for elevating oil from said main reservoir to said auxiliary reservoir, a spillway from said auxiliary reservoir to said main reservoir for maintaining the oil in said auxiliary reservoir at a constant level, a plurality of capillary tubes, each having one end in communication with said auxiliary reservoir below the level of the oil therein, a grooved abutment for the other end of each of said capillary tubes, the groove being substantially vertical and normally adjacent the end of the bore in the capillary tube and being of capillary dimensions so as to overcome the effects of surface tension and cause uniform flow of oil from the tube to the groove, a glass tube connected to receive the oil from said capillary groove, and means for conducting oil from said glass tube to a bearing to be lubricated.

4. Lubricating apparatus comprising a reservoir for lubricant, means for maintaining a supply of lubricant in said reservoir at a constant level, capillary means for withdrawing lubricant from said reservoir, a transparent tube having its upper end open to atmospheric air and receiving lubricant from said capillary means, said tube having a sufficiently small diameter bore, with respect to the rate of oil flow from said capillary means, that the oil will flow through the tube in short columns separated by bubbles of air, and means to conduct lubricant from the lower end of said tube to a part to be lubricated.

5. Lubricating apparatus comprising substantially constant level oil supply, capillary means for conducting oil from said supply, means for varying the rate of flow of oil through said capillary means, a receiver to collect oil from said capillary means, a transparent tube for draining lubricant from said receiver and having a bore sufficiently small to prevent concurrent flow of oil and air in opposite directions therethrough, and means for conducting oil from said transparent tube to parts to be supplied with oil.

6. An oil distributing and apportioning apparatus comprising a constant level oil supply, a plurality of capillary tubes each having its inlet end immersed in said oil supply, means for individually varying the elevations of the outlet ends of said tubes with respect to the level of said supply, receivers individual to each of said capillary tubes, glass tubes connected to said receivers respectively to drain oil therefrom, said glass tubes having bores of diameter slightly greater than sufficient to permit the flow of oil from said receivers when said capillary tubes are adjusted for maximum oil flow rate, whereby an amount of air dependent upon the rate of flow will be drawn through said glass tubes with the oil, and means to conduct oil from said glass tubes to parts requiring lubrication.

7. An oil distributing and apportioning apparatus comprising a constant level oil supply, a plurality of capillary tubes each having its inlet end immersed in said oil supply, means for individually varying the elevations of the outlet ends of said tubes with respect to the level of said supply, a member having a plurality of generally vertical capillary grooves, means to hold the outlet ends of said capillary tubes in engagement with said member with the ends of the tubes in registry with said grooves respectively, and means for conducting oil from said grooves to parts to be lubricated.

8. An oil distributing and apportioning apparatus comprising a constant level oil supply, a plurality of capillary tubes each having its inlet end immersed in said oil supply, means for individually varying the elevations of the outlet ends of said tubes with respect to the level of said supply, a member having a plurality of generally vertical capillary grooves, means to hold the outlet ends of said capillary tubes in engagement with said member with the ends of the tubes in registry with said grooves respectively, and means for conducting oil from said grooves to parts to be lubricated, said last named means comprising a plurality of glass tubes positioned to receive oil from said grooves respectively, said tubes having bores of diameter slightly greater than sufficient to permit the flow of the oil from said grooves under maximum flow conditions, whereby an amount of air dependent upon the rate of flow will be drawn through said tubes with the oil.

9. In a centralized lubricating system, the combination of a constant level oil reservoir, a manifold passageway connected to said reservoir through a port, a manually operable valve controlling flow of lubricant through said port, a plurality of flow resistance elements receiving oil from said manifold passageway, a receptacle for each of said resistance elements to receive lubricant therefrom, a glass tube positioned to drain the lubricant from said receptacles, the bores through said tubes being of sufficiently small size to prevent concurrent flow of lubricant and air therethrough in opposite directions, and means to conduct lubricant from said tubes to parts to be lubricated.

10. In a lubricator, the combination of a main reservoir for oil, an auxiliary reservoir located above the normal level of oil in said main reservoir, means for elevating oil from said main reservoir to said auxiliary reservoir, an overflow drain from said auxiliary reservoir to said main reservoir for maintaining the oil in said auxiliary reservoir at a constant level, a plurality of capillary tubes, each having one end in communication with said auxiliary reservoir below the level of the oil therein, a grooved abutment for the other end of each of said capillary tubes, the grooves being substantially vertical and of capillary dimensions, resilient means to hold the end of the capillary tube closely adjacent the grooved abutment so as to overcome the effects of surface tension and permit flow of oil from the tube to the groove, a small bore glass tube connected to receive the oil from said capillary groove, and means for conducting oil from said glass tube to a bearing to be lubricated.

11. In an apparatus for supplying oil to a plurality of bearings, the combination of a reservoir, means for maintaining oil in said reservoir at a constant level, a restricted metering conduit for conveying oil from said reservoir, a receiver for oil transmitted through said conduit, a transparent tube extending downwardly from said receiver, said transparent tube having a diameter of such size that oil and air will not pass therein, and means for connecting the lower end of said tube to a part to be supplied with oil, whereby the rate of flow of oil through said tube will be indicated by the relative amount of air drawn downwardly through said tube by the oil.

12. In a lubricator, the combination of a reservoir, means to maintain oil at a constant level in said reservoir, a plurality of capillary oil metering elements projecting into said reservoir below the level of the oil therein, means for individually adjusting said capillary elements to vary the rate of oil flow therethrough, a receiver to collect oil from each of said capillary elements, a glass tube connected to the bottom of each of said receivers to convey the oil therefrom, the maximum rate of flow through said elements being sufficiently small relative to the amount of oil conveyed through their respective glass tubes that said oil will flow through said glass tubes in slugs of oil extending completely across transverse sections of the tube, the slugs of oil being separated by air.

ERNEST W. DAVIS.